Patented Feb. 12, 1952

2,585,761

UNITED STATES PATENT OFFICE 2,585,761

ELECTRIC GLASS MELTING PROCESS

Robert Gallois, Paris, France

No Drawing. Application December 27, 1948, Serial No. 67,581. In France January 13, 1948

2 Claims. (Cl. 13—34)

The transformation of electrical energy into heat within the mass of a glass batch has been already used for the manufacture of glass with particular reference to the heating of a glass batch by dielectric losses in a high-frequency alternating electrical field, but the latter method is very costly an account of low efficiency and the use of fragile and onerous equipment.

The object of this invention is an electrical heating process which comprises three consecutive stages as follows:

In the first stage, the glass batch is heated, preferably by electrical resistances, until it has attained an electrical conductivity suitable for the second stage of the heating, which means up to a temperature of 400 to 600 degrees C. for ordinary soda-lime glass batches.

In the second stage, the mass of the glass batch itself works as a heating resistance. A gradient of alternating voltage not exceeding generally 100 volts per centimeter is then imposed and owing to the heat produced by the alternative electric current which runs through it, i. e. owing to the Joule effect, the temperature rises up to the point where the endothermic reactions of the components of the batch on one another are completed. The latter temperature is of about 1000° C. for ordinary soda-lime glass batches.

This second stage of the heating is carried out preferably in a heat-insulated mould two opposite faces of which, linked to the terminals of an alternating current generator are made of a not very oxidable material which conducts electricity well, such as graphite and some metals, whereas the other faces are made of a non-conducting material, such as a vitreous silica.

In the third stage, the glass batch, in which the endothermic reactions are completely finished and which is now a coherent mass, is completely melted and finally refined in a pot or in a tank preferably by electrical currents running between electrodes plunged into the glass bath.

What I claim is:

1. A method for transforming a glass batch into fused and refined glass which comprises: first, heating said batch by electrical resistances until its electrical conductivity is located between $10^{-6}$ohm$^{-1}$cm.$^{-1}$ and $10^{-3}$ohm$^{-1}$cm.$^{-1}$, these limits corresponding to temperatures of about 400 and 600 degrees C. for ordinary soda lime glass batches, then heating said batch by Joule effect in its mass up to the point where the endothermic reactions of its components on one another are completed, said mass then acting as an electrical resistance and becoming coherent, and after these two preliminary heating stages, melting the glass batch and refining the glass thus fused.

2. A method for transforming a glass batch according to claim 1 which consists in carrying out the second heating stage by means of an electric current the voltage gradient of which does not exceed 100 volts per centimeter.

ROBERT GALLOIS.

REFERENCES CITED

The following references are of record in the file of this patent:

UNITED STATES PATENTS

| Number | Name | Date |
| --- | --- | --- |
| 706,283 | Voelker | Aug. 5, 1902 |
| 762,270 | Benjamin | June 14, 1904 |
| 1,438,936 | Eimer | Dec. 12, 1922 |
| 1,564,235 | Harrington | Dec. 8, 1925 |
| 1,593,054 | Arbeit | July 20, 1926 |
| 1,897,973 | Wadman | Feb. 14, 1933 |
| 2,159,361 | Atkinson et al. | May 23, 1939 |
| 2,225,616 | Borel | Dec. 24, 1940 |

OTHER REFERENCES

"Textbook of Glass Technology," by Hodkin and Cousen; D. Van Nostrand Co., New York; 1925.